United States Patent Office 2,990,340
Patented June 27, 1961

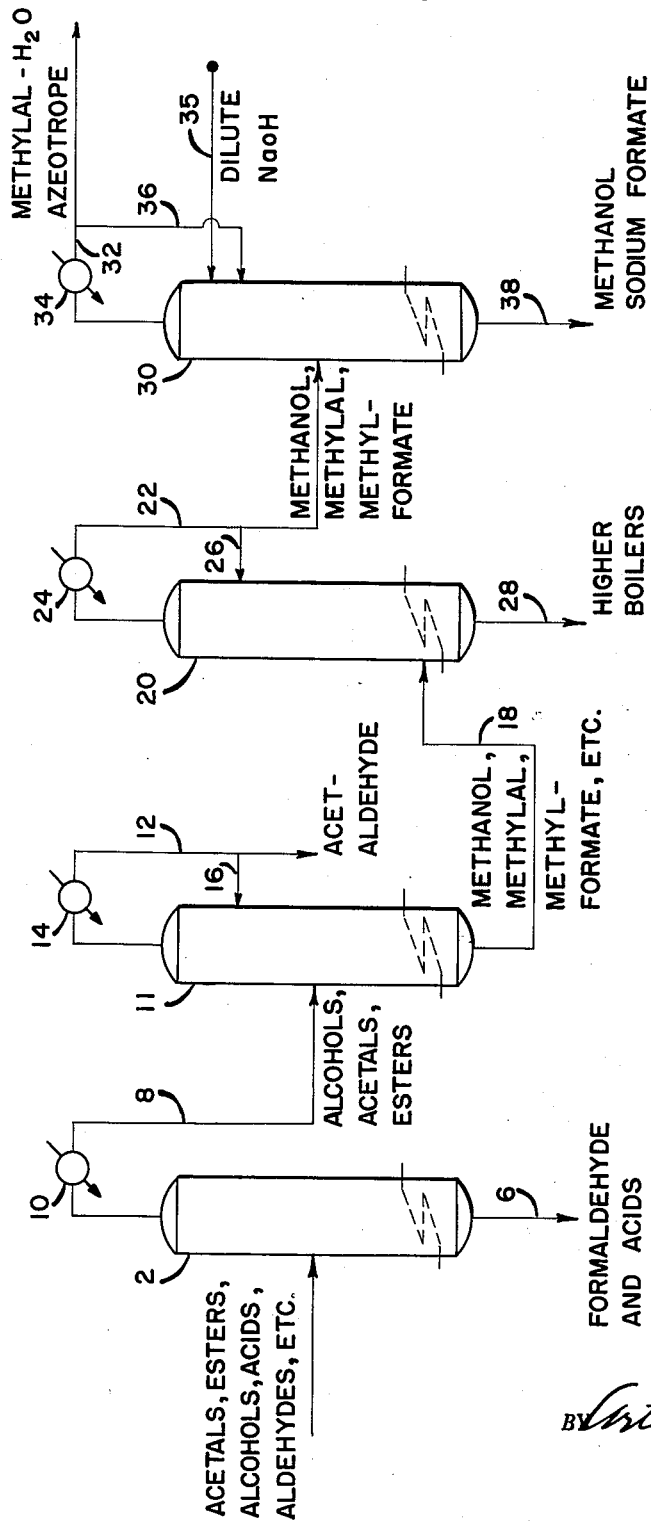

2,990,340
PROCESS FOR SEPARATION OF WATER-SOLUBLE CHEMICALS
David K. Barnes, Tulsa, Okla., assignor to Pan American Petroleum Corporation, a corporation of Delaware
Filed Sept. 8, 1953, Ser. No. 379,010
8 Claims. (Cl. 202—39.5)

The present invention relates to a procedure for separating various mixtures of oxygenated organic chemicals. More particularly, it is concerned with the separation into substantially pure components aqueous mixtures of oxygenated chemicals of the type produced in the partial oxidation of hydrocarbons.

Mixtures of the kind contemplated by my invention are encountered in a variety of chemical processing plants, especially those producing chemicals by means of the partial oxidation of hydrocarbons such as the light hydrocarbons—for example, methane, propane, butane, etc. In the production of chemicals via the partial oxidation of light hydrocarbons, an aqueous solution of products is obtained, hereinafter referred to as primary water, which may contain from about 25 to about 65 percent chemicals. Generally, this primary water is first subjected to distillation under conditions such that the bulk of the formaldehyde and of the carboxylic acids produced is obtained in the bottoms fraction, and the non-acid portion originally present in the primary water, substantially exclusive of formaldehyde, is recovered as distillate. The latter contains esters, alcohols, aldehydes, acetals and frequently some ketones. The bottoms, consisting essentially of an aqueous mixture of formaldehyde and carboxylic acids, can be processed in a known manner to separately recover formaldehyde and the acid fraction—for example, by subjecting the bottoms to a flashing or vacuum distillation operation. The distillate can be separated into its individual components by means of any of several known extractive distillation procedures. However, in all of such methods of which I am aware, at least a major portion of the aforesaid components is obtained in low concentration and requires the removal of relatively large volumes of water prior to procuring the compounds in substantially pure form.

Mixtures of the type contemplated by my invention, i.e., aqueous mixtures containing methyl formate, methylal and methanol, have previously been encountered in procedures involving the recovery of formaldehyde from primary water produced in the partial oxidation of light hydrocarbons. Thus, after topping the primary water—as mentioned above—to recover the non-acid chemicals other than formaldehyde, the resulting residue containing the bulk of the formaldehyde and all of the acids produced was subjected to distillation in the presence of at least sufficient methanol to combine with all of the formaldehyde in said residue. Under such circumstances methyl esters of the acids are formed, as well as methylal. Distillation of the reaction mixture results in bringing overhead methanol, methylal and the aforesaid methyl esters, including methyl formate. Methylal and methanol form an azeotrope boiling at 41.85° C., while methylal and water form an azeotrope boiling at 42.05° C. Also, with the presence of esters in this distillate, while their azeotropes boil substantially above those just mentioned, the existance of such azeotropes nevertheless adds materially to the complication of the overall separation problem. The above-mentioned distillate—containing methanol, methylal, methyl formate and other esters—was then subjected to distillation to yield an aqueous overhead containing all of the methylal and methyl formate, together with azeotropic methanol. This overhead was next sent to a saponification column where an aqueous solution of caustic was introduced at the top and allowed to contact the vapors and liquid containing methyl formate. Under such conditions the latter was converted into methanol and sodium formate, which was collected as bottoms while methanol, methylal and water were taken overhead. The methylal was then subjected to acid hydrolysis to liberate formaldehyde, and the resulting mixture distilled to give an aqueous bottoms of formaldehyde and an overhead of water, methanol and methylal which was recycled to an appropriate step in the process. Thus it can be seen that by such a procedure complete recovery of the formaldehyde by hydrolysis of the aqueous methylal-methanol mixture could not be realized.

Accordingly, it is an object of my invention to overcome the foregoing and other disadvantages accompanying the aforesaid prior art separation procedures by providing a method whereby no major product stream, in the separation of mixtures of the type contemplated, is diluted to any appreciable extent. It is another object of my invention to provide a process by which acetals can be separated from other close-boiling oxygenated non-acid organic compounds under conditions such that no hydrolysis of the acetals occurs. It is a further object of my invention to provide a method whereby acetal-alcohol mixtures may be separated by means of extractive distillation with an aqueous alkaline solution to recover separately aldehyde-free alcohol and the acetal as such.

In carrying out the process of my invention, an aqueous solution comprising esters, alcohols, acetals and aldehydes—as, for example, a mixture such as that described—from the partial oxidation of light hydrocarbons is first subjected to a topping operation up to a temperature of about 90° C. in order to take overhead the alcohols present and lower boiling components, including lower boiling azeotropes. This overhead usually contains from about 5 to about 20 percent water. The bottoms thus obtained—which contains the bulk of the chemicals originally present—consists essentially of an aqueous solution (50 to 75 percent water) of formaldehyde and water-soluble acids. The aforementioned overhead is distilled up to about 21° C. to take off a distillate of substantially pure acetaldehyde, and the resulting bottoms is thereafter fractionated to yield a distillate boiling in the range of from about 31° to about 43° C. The bottoms fraction from this distillation consists of higher boiling materials, about 75 percent of which consists of methanol and ethanol. A substantial amount of these two alcohols can be recovered in substantially pure form by means of ordinary fractionation. The aforesaid distillate, boiling over a range of from about 31° to about 43° C., consists essentially of methylal, methanol and methyl formate. This mixture cannot be separated by ordinary fractionation because—as previously mentioned—of the methylal-methanol binary boiling at 41.85° C. and the methylal-water boiling at 42.05° C. The bulk of the material distilled over near the front portion of the above-stated temperature range is methyl formate boiling at 31.9° C.

The above-mentioned mixture of azeotropes, together with methyl formate, is next subjected to an extractive distillation step with an aqueous alkaline solution under conditions such that a pH in excess of 7 is maintained, for example 8 to 12, in the distillation zone. Also, the distillation should be effected so that the amount of dilution water added with the alkali gives a concentration of water on the plates of at least about 70 mol percent, and preferably from about 75 to about 95 mol percent. A relatively wide range of alkaline materials may be used for the purpose of maintaining the desired pH within the distillation column. As examples of such compounds there may be mentioned the carbonates, bicarbonates and hydroxides of the alkali metals. The important factor, however, is that during the aforesaid extractive distillation step the pH should be maintained at least at the aforesaid minimum value. The alkaline solution employed may be added in varying concentrations; however the pH of the liquid in the distillation zone should always lie within a measurable range in excess of 7.

Under the above-described conditions of extractive distillation, the methyl formate is decomposed to methanol and the corresponding formic acid salt, and these compounds pass into the bottoms fraction. Overhead is taken an azeotrope of methylal and water in which the latter is present to the extent of only 1.4 percent. In connection with this particular step of my invention, it is to be pointed out that by effecting this separation through the use of extractive distillation with an aqueous alkaline solution it is possible to secure methanol which is entirely free from formaldehyde. This is possible because methylal is extremely stable in the pH range under which the separation is effected in accordance with my invention. On the other hand, substantial decomposition of methylal occurs if the pH of the dilution water is 7 or below. Thus in the case of separating acetals from close-boiling alcohols or from other close-boiling compounds by means of extractive distillation with water, it is observed that appreciable hydrolysis of the acetal takes place—causing a contamination of the alcohols by the liberated aldehydes. With acetals of formaldehyde, such contamination is quite extensive since free formaldehyde—in the presence of water—forms hydrates boiling above about 90° C. A further advantage of my invention resides in the fact that the methanol obtained as bottoms, because it is free from aldehydes, can be readily separated from the associated formic acid salt and—without an intermediate purification step of any kind—may be added to the main methanol purification column employed in the plant utilizing the process of this invention.

The process of my invention may be further illustrated by reference to the accompanying flow diagram wherein primary water obtained from the partial oxidation of light hydrocarbons is added to column 2 through line 4. This column is operated at an overhead vapor temperature of about 90° C. Under such conditions formaldehyde and acids may be withdrawn from the column through line 6, and this fraction further processed in accordance with methods outside the scope of my invention. Overhead through line 8 and condenser 10 alcohols, acetals, esters and azeotropic waters are taken and introduced as liquid feed into column 11. This column is operated at an overhead vapor temperature of about 21° C. to withdraw through line 12 and condenser 14 a stream acetaldehyde, and a portion of this distillate is returned to the column as reflux through line 16. The bottoms fraction from column 11 contains methylal, methanol and methyl formate, together with high boiling homologs of these compounds. This stream is withdrawn through line 18 and sent to column 20 where a fraction is taken overhead through line 22 and condenser 24, said fraction boiling over a range of from about 31° to about 43° C. A portion thereof is returned to the column as reflux through line 26. Higher boiling components of the feed fed to the column through line 18 are removed by line 28. Of this higher boiling residue, approximately 75 to 80 percent thereof consists of methanol and ethanol. Owing to the fact that this bottoms fraction is substantially anhydrous, these two alcohols are obtainable in relatively pure form by means of ordinary fractional distillation. Into column 30 is fed an aqueous mixture of methanol, methyl formate and methylal through line 22. Within this column the rising vapors are countercurrently contacted with a dilute (5 to 10 weight percent) aqueous solution of sodium hydroxide, said solution being introduced through line 35 in a quantity sufficient to maintain within the distillation zone from about 75 to about 95 mol percent liquid water. The pH of the liquids within the column varies from about 8 to about 12. Overhead is taken through line 32 and condenser 34 an azeotrope of methylal and water boiling at about 42.05° C. A portion of this distillate is refluxed to the column through line 36. From the bottom of column 30 is withdrawn through line 38 an aqueous solution of sodium formate and aldehyde-free methanol.

While the foregoing explanation of the accompanying flow diagram is illustrative of the process of my invention, it is to be strictly understood that said invention is not limited thereto. Thus, the preliminary steps of working up the initial feed mixture may be effected by the use of a number of existing methods. However, the particular procedure which has been herein described in detail has the apparent advantage of not requiring the dilution of any streams having relatively large quantities of chemicals. The process of my invention may be said to be directed primarily to the herein-disclosed novel method of handling the relatively complex and difficultly separable aqueous mixtures of methylal and methanol, and to the separation of acetals from alcohols or other close-boiling non-acid compounds.

I claim:

1. In a process for the separation of an acetal from an alcohol contained in a mixture thereof, wherein under ordinary extractive distillation with water said acetal tends to hydrolyze into its corresponding alcohol and aldehyde, the improvement which comprises introducing said mixture into an intermediate point of a fractionation zone, continuously adding sufficient water to said zone at a point substantially above the level at which said mixture was introduced to maintain a concentration of water within said zone of at least about 70 mole percent while maintaining the pH of the liquids in said zone at a measurable value of at least 8, removing overhead from the fractionation zone an aqueous distillate consisting essentially of said acetal, and recovering as a bottoms fraction an aqueous solution of the alcohol free from aldehyde, and in which the extractive distillation step is effected in the presence of a hydrolyzable ester of said alcohol and the aqueous alkaline solution employed is derived from a water-soluble alkali metal compound, said aqueous solution being used in an amount sufficient to maintain a concentration of water within the fractionation zone ranging from about 75 to about 95 mole percent while maintaining the pH of the liquids within said fractionation zone at a value ranging from about 8 to about 12.

2. The process of claim 1 in which the acetal is methylal and the alcohol is methanol and the extractive distillation step is effected in the presence of methyl formate.

3. The process of claim 1 in which the acetal is methylal and the alcohol is methanol and the extractive distillation step is effected in the presence of methyl formate.

4. In a process for the separation of methylal, methanol and methyl formate from an aqueous mixture thereof, together with higher boiling homologs of methylal, methanol and methyl formate, the improvement which comprises subjecting said mixture to fractional distillation, recovering a fraction boiling from about 31° C. to about 43° C. consisting essentially of methylal, methanol and methyl formate, thereafter introducing said fraction into an intermediate point of a fractionation zone, continuously adding a sufficient quantity of an aqueous alkaline solution at a point substantially above the level at which said fraction was introduced to maintain a concentration of liquid water within said fractionation zone ranging from about 75 to about 95 mol percent, maintaining the pH of the liquids present in said fractionation zone at a measurable value of at least 8, withdrawing overhead a methylal-water azeotrope, and removing as a bottoms fraction an aqueous solution of formaldehyde-free methanol and a formic acid salt.

5. The process of claim 4 in which the aqueous alkaline solution employed is a solution of a water-soluble alkali metal compound and the pH maintained is within a range of from about 8 to about 12.

6. In a process for recovering and purifying the components present in an aqueous solution containing aldehydes, acetals, alcohols and esters, including formaldehyde, methylal, methanol and methyl formate, the improvement which comprises introducing said solution into an intermediate point of a fractionation zone and distilling said mixture up to an overhead vapor temperature of about 90° C. to remove as distillate said methanol, methylal, methyl formate and acetaldehyde, separating the latter therefrom, thereafter subjecting the residue from the aforesaid acetaldehyde separation step to distillation and taking overhead a fraction boiling over a range of from about 31° to about 43° C., which fraction consists essentially of methanol, methylal and methyl formate, thereafter introducing said fraction into an intermediate section of a fractionation zone, continuously adding sufficient water in the form of an aqueous alkaline solution to said fractionation zone at a point substantially above the level at which said fraction was introduced into said zone to maintain a concentration of liquid water within said zone ranging from about 75 to about 95 mol percent, maintaining the pH of the liquids in said zone within a range of from about 8 to about 12, withdrawing overhead an azeotrope of methylal and water, and removing as bottoms an aqueous solution of methanol and formic acid salt, said bottoms being free from formaldehyde.

7. The process of claim 6 in which an aqueous solution of a water-soluble alkali metal compound is employed as the aqueous alkaline solution.

8. In a process for the separation of the components of an aqueous mixture consisting essentially of methylal, methanol and methyl formate, the improvement which comprises introducing said mixture into an intermediate section of a fractionation zone, continuously adding sufficient water in the form of an aqueous solution of a water-soluble alkali metal compound to said fractionation zone at a point substantially above the level at which said mixture was introduced into said zone to maintain a concentration of liquid water within said zone ranging from about 75 to about 95 mol percent, maintaining the pH of the liquids in said zone within a range of from about 8 to about 12, withdrawing overhead an azeotrope of methylal and water, and removing as bottoms an aqueous solution of methanol and alkali metal formic acid salt, said bottoms being free from formaldehyde.

References Cited in the file of this patent
UNITED STATES PATENTS

| | | |
|---|---|---|
| 2,545,889 | MacLean | Mar. 20, 1951 |
| 2,575,244 | Carlson et al. | Nov. 13, 1951 |
| 2,614,072 | Carlson et al. | Oct. 14, 1952 |
| 2,622,060 | Robeson | Dec. 16, 1952 |